No. 820,812. PATENTED MAY 15, 1906.
S. T. MUFFLY.
LIXIVIATOR.
APPLICATION FILED OCT. 6, 1905.

2 SHEETS—SHEET 1.

Witnesses:
Walter P. Pullinger
Titus Klaus

Inventor:
Sidney T. Muffly.
by his Attorneys.
Howson & Howson

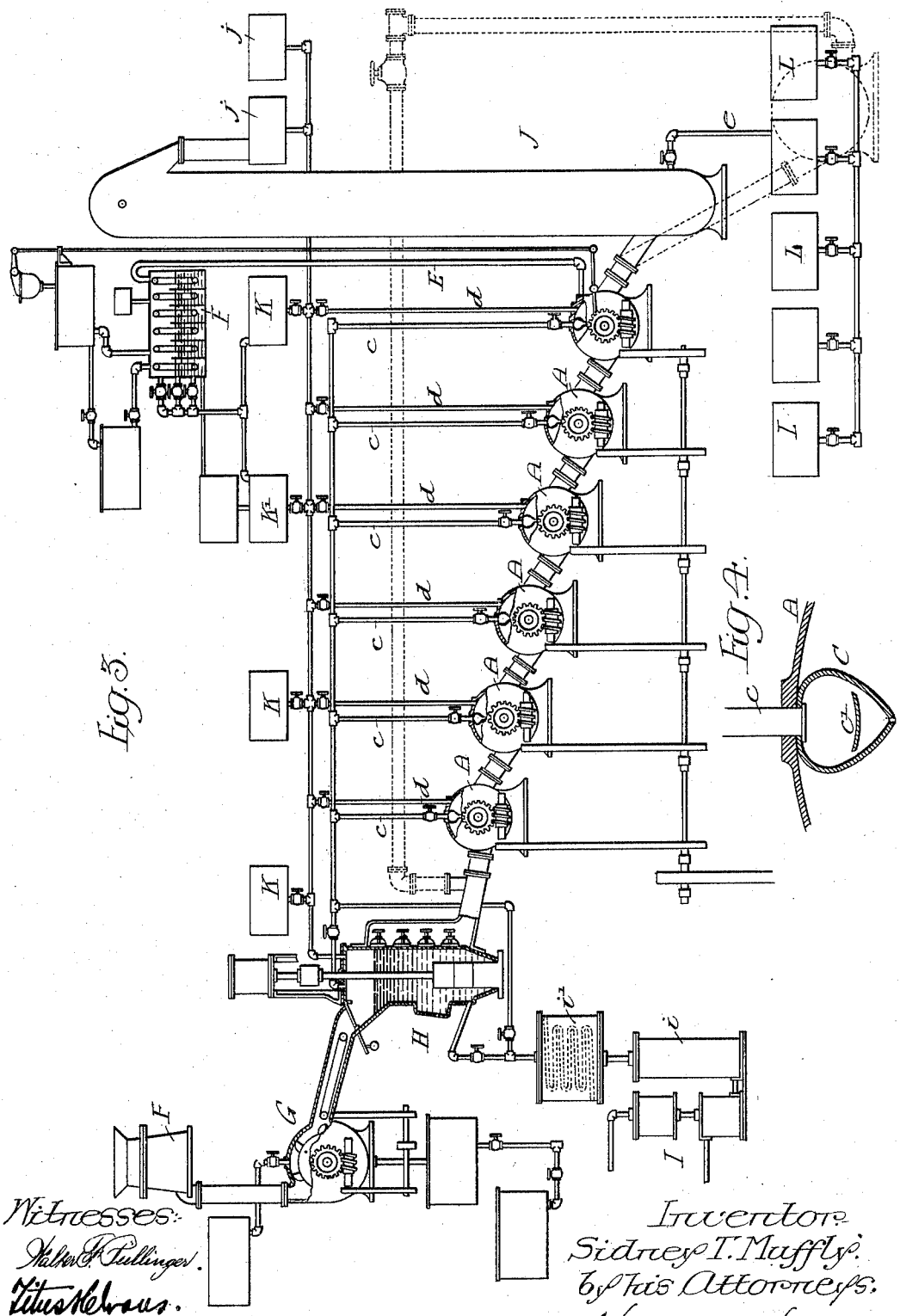

UNITED STATES PATENT OFFICE.

SIDNEY T. MUFFLY, OF PHILADELPHIA, PENNSYLVANIA, ASSIGNOR TO PHILADELPHIA CYANIDE PROCESS COMPANY, OF WILMINGTON, DELAWARE, AND PHILADELPHIA, PENNSYLVANIA, A CORPORATION OF DELAWARE.

LIXIVIATOR.

No. 820,812.  Specification of Letters Patent.  Patented May 15, 1906.

Application filed October 6, 1905. Serial No. 281,672.

*To all whom it may concern:*

Be it known that I, SIDNEY T. MUFFLY, a citizen of the United States, residing in Philadelphia, Pennsylvania, have invented certain Improvements in Lixiviators, of which the following is a specification.

One object of my invention is to provide a device of the class noted which shall be of such a construction that when one or a number together are used in connection with a plant for the extraction of metals from their ores the labor of handling the ore shall be reduced to a minimum.

A further object of the invention is to provide apparatus particularly applicable for the extraction of precious metals from the richest complex sulfid and silicious ores which cannot be perfectly treated by other cyanid processes, which apparatus shall also be particularly adapted to the treatment of low-grade ores by the cyanid process, its efficiency of operation being such that it shall be commercially possible to treat with profit ores running about one dollar to two dollars per ton of ore.

Another object is to provide an apparatus having the above characteristics which shall be adapted for use in connection with a continuously-operated extracting plant and one which shall by reason of its construction shorten the time of treatment necessary to extract the precious metals from ores as they pass through without intermission and which shall extract a large portion of such precious metal, or practically all of it, from the ore.

These objects I attain as hereinafter set forth, reference being had to the accompanying drawings, in which—

Figure 1:
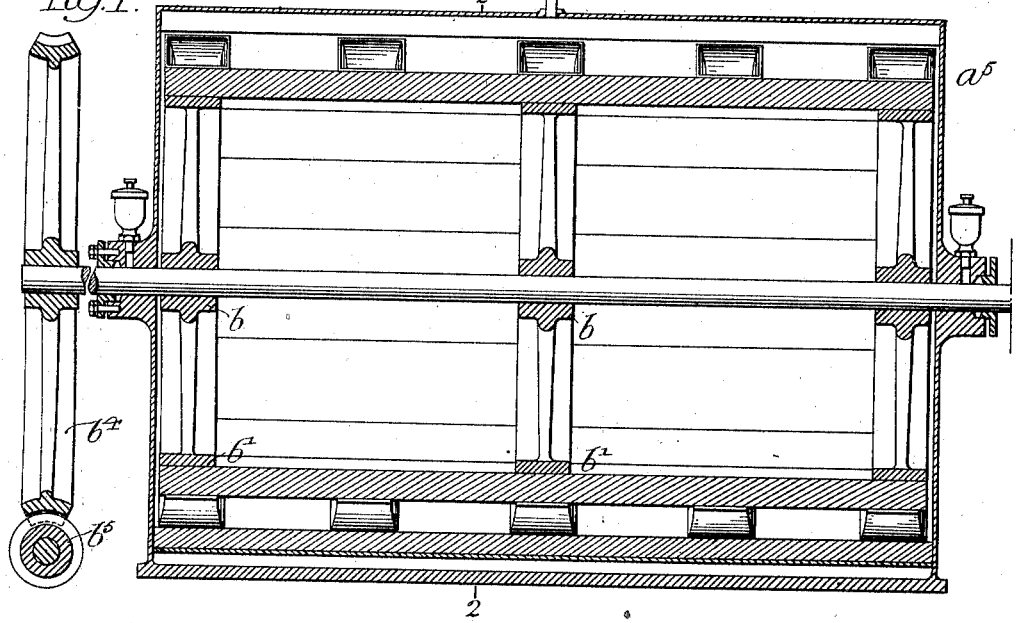
Figure 2:
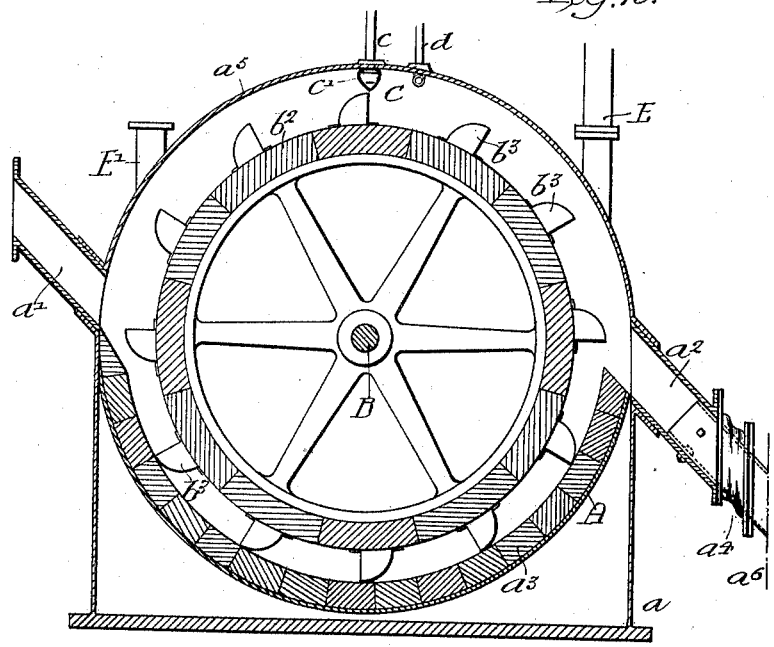

Figure 1 is a vertical section of the preferred form of a lixiviator constructed according to my invention. Fig. 2 is a vertical section on the line 2 2, Fig. 1, further illustrating the construction of the device. Fig. 3 is a diagrammatic elevation showing a number of my lixiviators as installed ready for operation in a plant for the treatment of the ores of precious metals by the cyanid process, and Fig. 4 is a vertical section illustrating the detail construction of the air-distributing device preferably employed in my lixiviators.

It will be understood that the lixiviator forming the subject of the present invention is particularly designed for use in connection with the process for the extraction of precious metals from their ores forming the subject of an application for United States patent, Serial No. 274,119, filed by me on the 14th day of August, 1905, although it is not necessarily so used.

In the drawings herewith, A represents a stationary receptacle having a base $a$, designed to be securely bolted to a suitable foundation, the receptacle being provided with an ore-pulp inlet $a'$, an ore-pulp outlet $a^2$, and a close cover $a^5$. Both the inlet and outlet have flanged fittings for connection with other receptacles or apparatus, the outlet $a^2$ having an adjustable sleeve $a^6$, internally attached at one end, while its other end is close-fitting, but movable in the inlet of a lixiviator or other apparatus following. This connection is provided with a flexible rubber casing $d^4$ for the purpose of making it fluid-tight. The inlet and outlet, respectively, enter and leave opposite sides of the receptacle A in lines preferably tangential to a circle or circles concentric with its inner curved surface.

Supported in suitable bearings in the ends of the receptacle is a shaft B, having fixed to it a series of hubs $b$, carrying rings $b'$, which serve as a support for a drum $b^2$, upon whose surface is carried a series of buckets $b^3$. The lower portion of the interior of the receptacle is provided with a lining $a^3$, of wood, of such thickness that its surface is just cleared by the buckets on the drum $b^2$ when the latter is revolved. For turning the drum-carrying shaft B, I provide a worm-wheel $b^4$, which I drive by means of a worm $b^5$, connected to any suitable source of power.

Extending longitudinally within the receptacle-cover, at the top thereof, is an air-conduit C, connected to an air-supply pipe $c$. This conduit, as shown in Fig. 4, is made with a narrow slot in its lowermost portion, whereby air may be simultaneously and uniformly delivered from said conduit within the whole length of the receptacle, and in order that the pressure of the air issuing from the slit may be substantially the same at all points of the conduit I provide within the latter a longitudinally-extending deflecting-plate $c'$, which prevents the air flowing directly from the supply-pipe out through the portion of the slot in the conduit nearest it. A perforated pipe D also extends longitudinally within the top of the cover of receptacle A and is connected to a pipe $d$, through which cyanid solution is delivered from any suitable reservoir of the same. I also provide a pipe E to carry off the gas formed or generated during the operation of the apparatus, this gas in the process for which my apparatus is particularly designed being hydrocyanic-acid gas, which is led through said pipe E to apparatus designed for its recovery. A second pipe connection E' is provided, which may be attached to a pump for returning pulp or ore to the lixiviator for repeated treatment—as, for example, in the case of a comparatively small plant using but a single lixiviator.

The connections of my apparatus under operating conditions are shown in Fig. 3, in which six receptacles are connected in series, there being between the inlet and outlet connections of successive receptacles the flexible connection $a^4$, of rubber or other suitable material, inclosing the movable sleeve $a^6$, as previously noted, whereby rigid connection, and consequent straining, of the various machines under operating conditions is avoided. In this figure it will be seen that the ore to be treated is delivered from a crusher F to the neutralizer G and from thence to an inclosed stamp-mortar H. This stamp-mortar, together with all of the receptacles A, is connected to the reservoir $i$ of an air-compressor I, between which and said apparatus is interposed an air-heating device $i'$. The stamp-mortar is connected to the first of the series of receptacles, while the last of said series is connected to an inclosed bucket conveyer J, which discharges into any of a series of covered tanks $j$, from which the tailings, after being washed to secure the last portions of the cyanid solution, are taken from time to time to the dump.

The hydrocyanic-acid gas generated during the operation of the lixiviators is conducted through the pipe E to a suitable condensing or absorbing device F, in which said gas is dissolved in a suitable solution and reused in carrying out the process. The cyanid solution is added to the various lixiviators and to the stamp-mortar from a series of close-covered tanks K and K', suitably connected, as shown, while the cyanid solution containing the precious metals is led from the lower portion of the bucket conveyer J through a pipe $l$ to the covered tanks L, from which it is taken for electrolytic or other precipitation of the precious metals in it.

Under the conditions existing in such a plant as that described above and illustrated in Fig. 3 it will be understood that the crushed ore and a certain amount of the cyanid solution are delivered to each of the receptacles A through the inlet-fitting $a'$ and are then caught and carried in the buckets $b^3$ of the drum $b^2$ around to the other side of the receptacle A, where they are delivered into the outlet $a^2$, from whence they flow by gravity to the next lixiviator of the series. By my process cyanid solution of suitable strength is supplied throughout the whole length of the receptacle A by means of the perforated pipe D, which is connected by suitable piping to the covered tanks K and K'.

During the operation of the device compressed air, preferably heated, is supplied through the pipes $c$ and is delivered throughout the whole length of the lixiviator-receptacles from the air-conduit C. With this arrangement of apparatus I have found that the various advantageous results heretofore noted are successfully and efficiently secured, while owing to the flexible connection $a^4$ between the successive lixiviators I have found that undue strain and injury is prevented, since it is possible for one or more of these devices to vibrate in the manner common under operating conditions without transmitting such vibration to the others of the series.

While I have illustrated the drum $b^2$ as provided with structures to which I have referred as "buckets," it will be understood that, if desired, I may under certain conditions employ other equivalent devices for carrying the ore-pulp around on said drums from one side of the receptacle to the other.

I claim as my invention—

1. A lixiviator consisting of a containing-receptacle having an inlet and an outlet, a revoluble structure within the receptacle having pulp-carrying means, with a wooden lining within the lower portion of said receptacle, substantially as described.

2. A lixiviator consisting of a receptacle having an inlet and an outlet, a revoluble structure within said receptacle having means thereon for carrying pulp from one side of the receptacle to the other, said structure consisting of a revoluble framework provided with a shell consisting of longitudinal wooden elements, the pulp-carrying means being attached to said shell, substantially as described.

3. A lixiviator consisting of a substantially horizontal receptacle having an inlet and an outlet, a revoluble structure inside said receptacle and provided with means for carrying ore-pulp from the inlet around the receptacle to the outlet, said means being constructed to deliver the pulp into the outlet, and said outlet extending from said receptacle at an angle other than ninety degrees to the surface thereof, substantially as described.

4. A lixiviator consisting of a substantially horizontal receptacle with inlet and outlet fittings entering said receptacle at angles other than ninety degrees to the surface thereof and on opposite sides of the same, and a revoluble structure within the receptacle having means for receiving ore-pulp from the inlet-fitting and transferring it from one side to the other of said receptacle to the outlet-fitting, substantially as described.

5. A lixiviator consisting of a receptacle having an inlet and an outlet on opposite sides thereof, a revoluble structure in the receptacle having means for transferring material in lines at right angles to its axis of rotation, transversely of the receptacle from the inlet to the outlet, a fluid-supply pipe above the receptacle and an air-conduit extending in the upper portion of the receptacle for delivering air to the receptacle so that it exerts a direct downward pressure upon the liquid therein, substantially as described.

6. A lixiviator consisting of a receptacle having an inlet and an outlet, a revoluble device within the receptacle for transferring material therein to the outlet, with a substantially horizontal air-conduit connected to a source of air-supply and extending in the upper portion of the receptacle, said conduit being provided with a longitudinal slot whereby air under pressure is delivered throughout the entire length of the receptacle and caused to exert a direct downward pressure upon the surface of the liquid therein, substantially as described.

7. A lixiviator consisting of a receptacle having an inlet and an outlet, a revoluble device within the receptacle for transferring material therein to the outlet, with a substantially horizontal air-conduit connected to a source of air-supply and extending in the upper portion of the receptacle, said conduit being provided with a longitudinal slot whereby air under pressure is delivered throughout the length of the receptacle and caused to exert a direct downward pressure upon the surface of the liquid therein, said air-conduit being provided with an internal longitudinally-extending deflector, whereby the air is caused to be delivered with substantially uniformity from the entire length of the said slot, substantially as described.

8. A lixiviator consisting of a receptacle having an inlet and an outlet on opposite sides thereof and provided with a revoluble structure having buckets for transferring material transversely to the axis of said structure from the inlet to the outlet, means inside the receptacle for delivering air so that it will exert a direct downward pressure upon liquid therein, and a perforated pipe for delivering liquid to said receptacle, substantially as described.

In testimony whereof I have signed my name to this specification in the presence of two subscribing witnesses.

SIDNEY T. MUFFLY.

Witnesses:
 WALTER CHISM,
 JOS. H. KLEIN.